UNITED STATES PATENT OFFICE.

ROBERT HARPER, OF TRUMBULL, OHIO.

IMPROVEMENT IN TANNING.

Specification forming part of Letters Patent No. 30,220, dated October 2, 1860.

*To all whom it may concern:*

Be it known that I, ROBERT HARPER, of Trumbull, in the county of Ashtabula and State of Ohio, have invented a new and Improved Process of Tanning Leather; and I do hereby declare that the following is a full and exact description thereof—to wit, a combination of weeds, herbs, and drugs—viz., worm-seed, thoroughwort or boneset and golden rod, to be used in connection with japonica, alum, and saltpeter. A liquor to be made by steaming the weeds together in equal proportions, then adding the japonica, alum, and saltpeter in the proportions of fifty pounds of japonica, ten pounds of alum, and one pound of saltpeter to two hundred pounds of the above weeds or plants when dry, the above specified quantities being sufficient for one hundred calf-skins.

Now, what I claim as my invention, and desire to secure by Letters Patent, is—

The use of the above-mentioned weeds, in combination with the aforesaid drugs in the proportions named, thereby facilitating the process of tanning, as well as being much cheaper than the usual process of tanning with bark.

ROBERT HARPER.

In presence of—
   ED. A. WRIGHT,
   ABBY A. SPOFFORD.